United States Patent
Favela et al.

(10) Patent No.: US 11,715,262 B2
(45) Date of Patent: Aug. 1, 2023

(54) OPTIMIZING PRIMITIVE SHADERS

(71) Applicant: ADVANCED MICRO DEVICES, INC., Santa Clara, CA (US)

(72) Inventors: Brian J. Favela, Boxborough, MA (US); Todd Martin, Orlando, FL (US); Mangesh P. Nijasure, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/221,916

(22) Filed: Dec. 17, 2018

(65) Prior Publication Data

US 2020/0193703 A1 Jun. 18, 2020

(51) Int. Cl.
*G06T 17/10* (2006.01)
*G06T 1/20* (2006.01)
*G06F 9/38* (2018.01)
*G06T 15/00* (2011.01)

(52) U.S. Cl.
CPC ............ *G06T 17/10* (2013.01); *G06F 9/3877* (2013.01); *G06T 1/20* (2013.01); *G06T 15/005* (2013.01)

(58) Field of Classification Search
CPC ......... G06T 17/10; G06T 1/20; G06T 15/005; G06F 9/3877
USPC ........................................................ 345/502
See application file for complete search history.

(56) References Cited

U.S. PATENT DOCUMENTS

| | | | |
|---|---|---|---|
| 6,597,363 B1 * | 7/2003 | Duluk, Jr. ............. | G06T 15/005 345/506 |
| 2008/0074430 A1 * | 3/2008 | Jiao ........................ | G06T 15/005 345/506 |
| 2011/0080406 A1 * | 4/2011 | Hakura ................... | G06T 15/50 345/426 |
| 2016/0086299 A1 * | 3/2016 | Sharma .................... | G06T 1/20 345/422 |
| 2017/0061678 A1 * | 3/2017 | Engh-Halstvedt ...... | G06T 15/40 |
| 2020/0098078 A1 * | 3/2020 | Bujewski .................. | G06T 1/20 |

* cited by examiner

*Primary Examiner* — Hai Tao Sun

(57) ABSTRACT

A method of deferred vertex attribute shading includes computing, at a graphics processing pipeline of a graphics processing unit (GPU), a plurality of vertex attributes for vertices of each primitive of a set of primitives. The plurality of vertex attributes to be computed includes a vertex position attribute and at least a first non-position attribute for each primitive. One or more primitives of the set of primitives that do not contribute to a rendered image are discarded based upon the vertex position attribute for vertices of the set of primitives. A set of surviving primitives is generated based on the culling and deferred attribute shading is performed for at least a second non-position attribute for vertices of the set of surviving primitives.

19 Claims, 4 Drawing Sheets

OPTIMIZING PRIMITIVE SHADERS

BACKGROUND

Graphics processing units (GPUs) include numerous compute units for executing instructions concurrently or in parallel. In some cases, a GPU implements a graphics pipeline to render two-dimensional (2D) images from a three-dimensional (3D) representation of a scene. A conventional graphics pipeline for processing 3D graphics is formed of a sequence of fixed-function hardware block arrangements supported by programmable shaders that execute on the compute units in the GPU. These arrangements are usually specified by a graphics application programming interface (API) processing order such as specified in various specifications.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
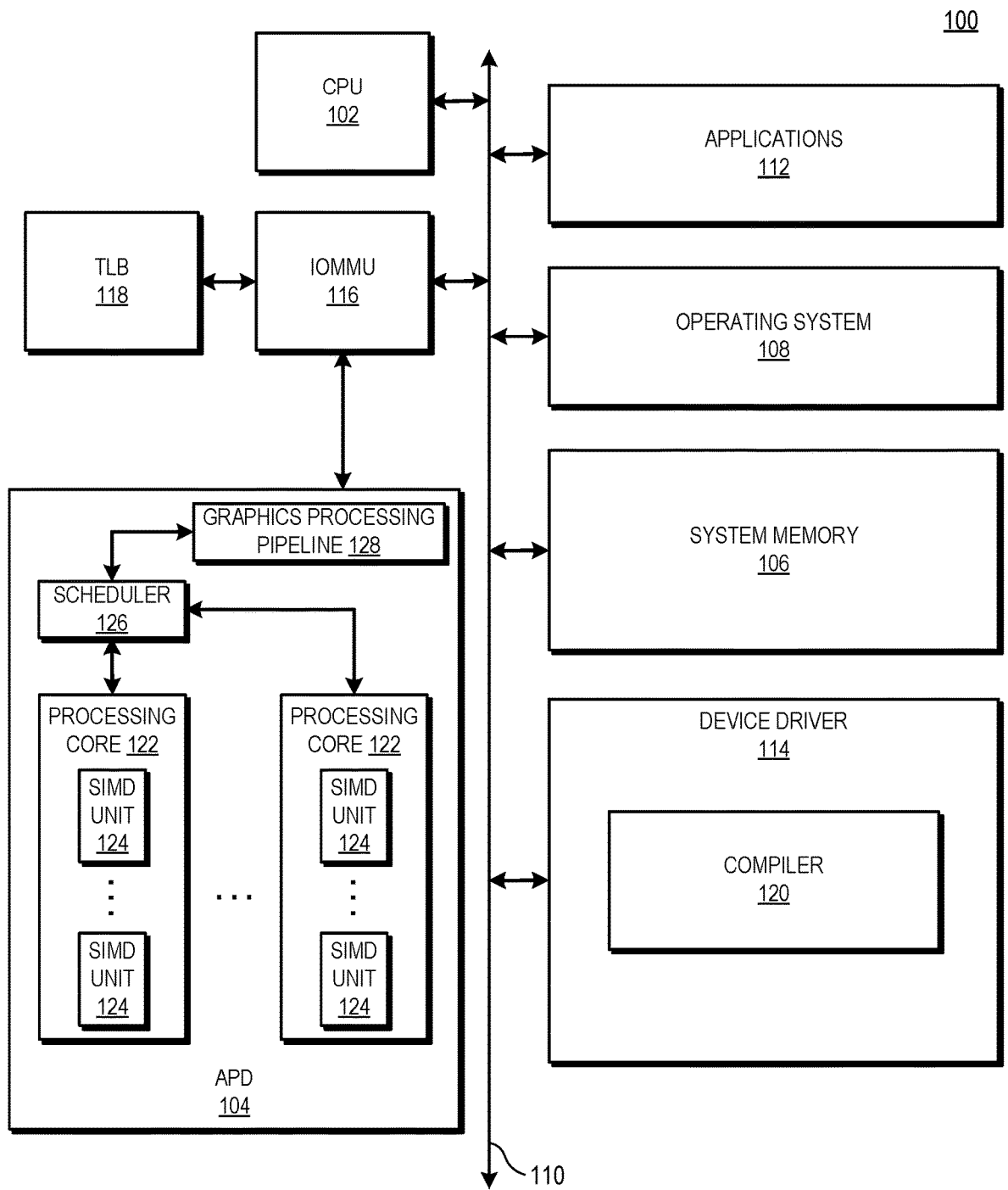
FIG. 1 is a block diagram of a processing system in accordance with some embodiments.

Graphics processing is typically carried out in a pipelined fashion, with multiple pipeline stages operating on the data to generate the final rendering output (e.g., a frame that is displayed). Many graphics processing pipelines now include one or more programmable processing stages, commonly referred to as "shaders", which execute programs to perform graphics processing operations to generate the desired graphics data. For example, the graphics processing pipeline includes a vertex shader and a pixel (fragment) shader. These shaders are programmable processing stages that execute shader programs on input data values to generate a desired set of output data values for being further processed by the rest of the graphics pipeline stages. The shaders of the graphics processing pipeline share programmable processing circuitry or alternatively include distinct programmable processing units.

Power and efficiency for graphics processors is important. Substantial efforts have gone into reducing unnecessary graphics processing operations. FIGS. 1-4 disclose systems and techniques to improve the efficiency of graphics processing pipelines. In some embodiments, a method of deferred vertex attribute shading includes computing, at a graphics processing pipeline of a graphics processing unit (GPU), a plurality of vertex attributes for vertices of each primitive (e.g., a primitive type or topology that define how vertices are interpreted and rendered by the graphics processing pipeline) of a set of primitives. Geometry data includes graphics data items which describe geometry to be rendered. For example, the graphics data items represent geometric shapes, which describe surfaces of structures in the scene and which are referred to as "primitives". A common primitive shape is a triangle, but primitives include other 2D shapes, lines, or points. Scenes typically contain many objects, with objects are composed of one or more of such primitives (e.g., objects can be composed of many thousands, or even millions of such primitives).

In various embodiments, the plurality of vertex attributes to be computed includes a vertex position attribute and at least a first non-position attribute for each primitive. One or more primitives of the set of primitives that do not contribute to a rendered image are discarded based upon the vertex position attribute for vertices of the set of primitives. For example, in some embodiments, the discarding of primitives includes primitive clipping and/or primitive culling (e.g., frustum and face culling) to discard primitives corresponding to parts of a scene that do not contribute to the final image to be displayed (e.g., vertices and primitives that will not contribute to generating pixels on a display screen). A set of surviving primitives is generated based on the culling and deferred attribute shading is performed for at least a second non-position attribute for vertices of the set of culled primitives. In this manner, processing efficiency of the graphics processing pipeline is increased because the number of computations related to non-position attributes for primitives that are not rendered in the final image is reduced.

FIG. 1 is a block diagram of a processing system 100 in accordance with some embodiments. The processing system 100 includes a central processing unit (CPU) 102 and an accelerated processing device (APD) 104. In various embodiments, the CPU 102 includes one or more single- or multi-core CPUs. In various embodiments, the APD 104 includes any cooperating collection of hardware and/or software that perform functions and computations associated with accelerating graphics processing tasks, data parallel tasks, nested data parallel tasks in an accelerated manner with respect to resources such as conventional CPUs, conventional graphics processing units (GPUs), and combinations thereof. Although GPUs, accelerated processing units (APUs), and general purpose use of the graphics processing unit (GPGPU) are commonly used terms in this field, the expression "accelerated processing device (APD)" as used herein is a broader expression. In the embodiment of FIG. 1, the processing system 100 is formed on a single silicon die or package that combines the CPU 102 and the APD 104 to provide a unified programming and execution environment. This environment enables the APD 104 to be used as fluidly as the CPU 102 for some programming tasks. In other embodiments, the CPU 102 and the APD 104 are formed separately and mounted on the same or different substrates. It should be appreciated that processing system 100 may include more or fewer components than illustrated in FIG. 1. For example, processing system 100 may additionally include one or more input interfaces, non-volatile storage, one or more output interfaces, network interfaces, and one or more displays or display interfaces.

As illustrated in FIG. 1, the processing system 100 also includes a system memory 106, an operating system 108, a communications infrastructure 110, and one or more applications 112. Access to system memory 106 is managed by a memory controller (not shown), which is coupled to memory 106. For example, requests from the CPU 102 or other devices for reading from or for writing to system memory 106 are managed by the memory controller. In some embodiments, the one or more applications 112 include various programs or commands to perform computations that are also executed at the CPU 102. The CPU 102 sends selected commands for processing at the APD 104.

The operating system 108 and the communications infrastructure 110 are discussed in greater detail below. The processing system 100 further includes a device driver 114 and a memory management unit, such as an input/output memory management unit (IOMMU) 116. Components of processing system 100 may be implemented as hardware, firmware, software, or any combination thereof. In some embodiments the processing system 100 includes one or more software, hardware, and firmware components in addition to or different from those shown in FIG. 1.

Within the processing system 100, the system memory 106 includes non-persistent memory, such as DRAM (not shown). In various embodiments, the system memory 106 stores processing logic instructions, constant values, variable values during execution of portions of applications or other processing logic, or other desired information. For example, in various embodiments, parts of control logic to perform one or more operations on CPU 102 reside within system memory 106 during execution of the respective portions of the operation by CPU 102. During execution, respective applications, operating system functions, processing logic commands, and system software reside in system memory 106. Control logic commands that are fundamental to operating system 108 generally reside in system memory 106 during execution. In some embodiments, other software commands (e.g., device driver 114) also reside in system memory 106 during execution of processing system 100.

The IOMMU 116 is a multi-context memory management unit. As used herein, context is considered the environment within which the kernels execute and the domain in which synchronization and memory management is defined. The context includes a set of devices, the memory accessible to those devices, the corresponding memory properties, and one or more command-queues used to schedule execution of a kernel(s) or operations on memory objects. The IOMMU 116 includes logic to perform virtual to physical address translation for memory page access for devices, such as the APD 104. In some embodiments, the IOMMU 116 also includes, or has access to, a translation lookaside buffer (TLB) 118. The TLB 118, as an example, is implemented in a content addressable memory (CAM) to accelerate translation of logical (i.e., virtual) memory addresses to physical memory addresses for requests made by the APD 104 for data in system memory 106.

In various embodiments, the communications infrastructure 110 interconnects the components of processing system 100. Communications infrastructure 110 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some embodiments, communications infrastructure 110 also includes an Ethernet network or any other suitable physical communications infrastructure that satisfies an application's data transfer rate requirements. Communications infrastructure 110 also includes the functionality to interconnect components, including components of processing system 100.

A driver, such as device driver 114, communicates with a device (e.g., APD 104) through an interconnect or the communications infrastructure 110. When a calling program invokes a routine in the device driver 114, the device driver 114 issues commands to the device. Once the device sends data back to the driver device 114, the device driver 114 invoke routines in an original calling program. In general, device drivers are hardware-dependent and operating-system-specific to provide interrupt handling required for any necessary asynchronous time-dependent hardware interface. In some embodiments, a compiler 120 is embedded within device driver 114. The compiler 120 compiles source code into program instructions as needed for execution by the processing system 100. During such compilation, the compiler 120 applies transforms to program instructions at various phases of compilation. In other embodiments, the compiler 120 is a stand-alone application. In various embodiments, the device driver 114 controls operation of the APD 104 by, for example, providing an application programming interface (API) to software (e.g., applications 112) executing at the CPU 102 to access various functionality of the APD 104.

The CPU 102 includes (not shown) one or more of a control processor, field programmable gate array (FPGA), application specific integrated circuit (ASIC), or digital signal processor (DSP). The CPU 102 executes at least a portion of the control logic that controls the operation of the processing system 100. For example, in various embodiments, the CPU 102 executes the operating system 108, the one or more applications 112, and the device driver 114. In some embodiments, the CPU 102 initiates and controls the execution of the one or more applications 112 by distributing the processing associated with one or more applications 112 across the CPU 102 and other processing resources, such as the APD 104.

The APD 104 executes commands and programs for selected functions, such as graphics operations and other operations that are particularly suited for parallel processing. In general, APD 104 is frequently used for executing graphics pipeline operations, such as pixel operations, geometric computations, and rendering an image to a display. In some embodiments, APD 104 also executes compute processing operations (e.g., those operations unrelated to graphics such as video operations, physics simulations, computational fluid dynamics, etc.), based on commands or instructions received from the CPU 102. For example, such commands include special instructions that are not typically defined in the instruction set architecture (ISA) of the APD 104. In some embodiments, the APD 104 receives an image geometry representing a graphics image, along with one or more commands or instructions for rendering and displaying the image. In various embodiments, the image geometry corresponds to a representation of a two-dimensional (2D) or three-dimensional (3D) computerized graphics image.

In various embodiments, the APD 104 includes one or more compute units, such as one or more processing cores 122 that include one or more SIMD units 124 configured to execute a thread concurrently with execution of other threads in a wavefront, e.g., according to a single-instruction, multiple-data (SIMD) execution model. The SIMD execution model is one in which multiple processing elements share a single program control flow unit and program counter and thus execute the same program but are able to execute that program with different data. Some embodiments of the APD 104 are used to implement a GPU and, in that case, the processing cores 122 are referred to as shader cores or streaming multi-processors (SMXs). The number of processing cores 122 that are implemented in the APD 104 is a matter of design choice. Each processing core 122 includes one or more processing elements such as scalar and/or vector floating-point units, arithmetic and logic units (ALUs), and the like. In various embodiments, the processing cores 122 also include special purpose processing units (not shown), such as inverse-square root units and sine/cosine units.

Each of the one or more processing cores 122 executes a respective instantiation of a particular work-item to process incoming data, where the basic unit of execution in the one or more processing cores 122 is a work-item (e.g., a thread). Each work-item represents a single instantiation of, for example, a collection of parallel executions of a kernel invoked on a device by a command that is to be executed in parallel. A work-item executes at one or more processing elements as part of a work-group executing at a processing core 122.

The APD 104 includes GPUs that issue and execute work-items including groups of threads executed simultaneously as a "wavefront" on a single SIMD unit 124. Wavefronts may also be interchangeably referred to as warps, vectors, or threads. In some embodiments, wavefronts include instances of parallel execution of a shader program, where each wavefront includes multiple work-items that execute simultaneously on a single SIMD unit 124 in line with the SIMD paradigm (e.g., one instruction control unit executing the same stream of instructions with multiple data). A scheduler 126 is configured to perform operations related to scheduling various wavefronts on different processing cores 122 and SIMD units 124, as well as performing other operations for orchestrating various tasks on the APD 104.

To reduce latency associated with off-chip memory access, various APD architectures include a memory cache hierarchy (not shown) including, for example, L1 cache and a local data share (LDS). The LDS is a high-speed, low-latency memory private to each processing core 122. In some embodiments, the LDS is a full gather/scatter model so that a work-group writes anywhere in an allocated space.

The parallelism afforded by the one or more processing cores 122 is suitable for graphics related operations such as pixel value calculations, vertex transformations, tessellation, geometry shading operations, and other graphics operations. A graphics processing pipeline 128 accepts graphics processing commands from the CPU 102 and thus provides computation tasks to the one or more processing cores 122 for execution in parallel. Some graphics pipeline operations, such as pixel processing and other parallel computation operations, require that the same command stream or compute kernel be performed on streams or collections of input data elements. Respective instantiations of the same compute kernel are executed concurrently on multiple SIMD 124 units in the one or more processing cores 122 in order to process such data elements in parallel. As referred to herein, for example, a compute kernel is a function containing instructions declared in a program and executed on an APD processing core 122. This function is also referred to as a kernel, a shader, a shader program, or a program.

The graphics processing pipeline 128 includes multiple stages (not shown in FIG. 1 in the interest of clarity) configured for concurrent processing of different primitives in response to a draw call. In various embodiments, stages of the graphics processing pipeline 128 concurrently process different primitives generated by an application, such as a video game. When geometry data is submitted to the graphics processing pipeline 128, hardware state settings are chosen to define a state of the graphics processing pipeline 128. Examples of state include a rasterizer state, a blend state, a depth stencil state, a primitive topology type of the submitted geometry, and the shaders (e.g., vertex shader, domain shader, geometry shader, hull shader, pixel shader, and the like) that are used to render the scene. The shaders that are implemented in the graphics pipeline state are represented by corresponding byte codes. In some cases, the information representing the graphics pipeline state is hashed or compressed to provide a more efficient representation of the graphics pipeline state.

In various embodiments, a vertex shader includes at least two main functions: to place vertices of a geometry in clipped space and generate clipped space position values for vertices to be rasterized; and to perform attribute shading on vertex parameters such as vertex position, color, UV texture coordinates, and any other per-vertex parameters requested by API requests for graphics processing. The vertex shader performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transforms are considered to modify the coordinates or "position" of the vertices on which the transforms are performed. Other operations of the vertex shader that modify attributes other than the coordinates are considered to modify non-position attributes. Non-position attributes are also referred to herein as "parameters."

After processing of vertices at the vertex shader, various embodiments of the graphics processing pipeline 128 perform primitive clipping and/or primitive culling (e.g., frustum and face culling such as described in more detail below) to remove parts of a scene that do not contribute to the final image to be displayed (e.g., vertices and primitives that will not contribute to generating pixels on a display screen). However, culling often occurs after operations of the vertex shader such that certain computationally intensive functions for fetching and vertex shading will have already been performed for non-visible and/or hidden surfaces. Accordingly, as described in more detail herein, the processing system 100 is configured to improve performance of the graphics processing pipeline 128 by deferring a portion of vertex fetching/decoding and shading operations. By providing fetching and shading operations of vertex attributes only with respect to vertices of visible primitives within a given image geometry, power consumption and performance within the processing system 100 is improved by reducing unnecessary vertex stream fetching and vertex shading computations.

Figure 2:
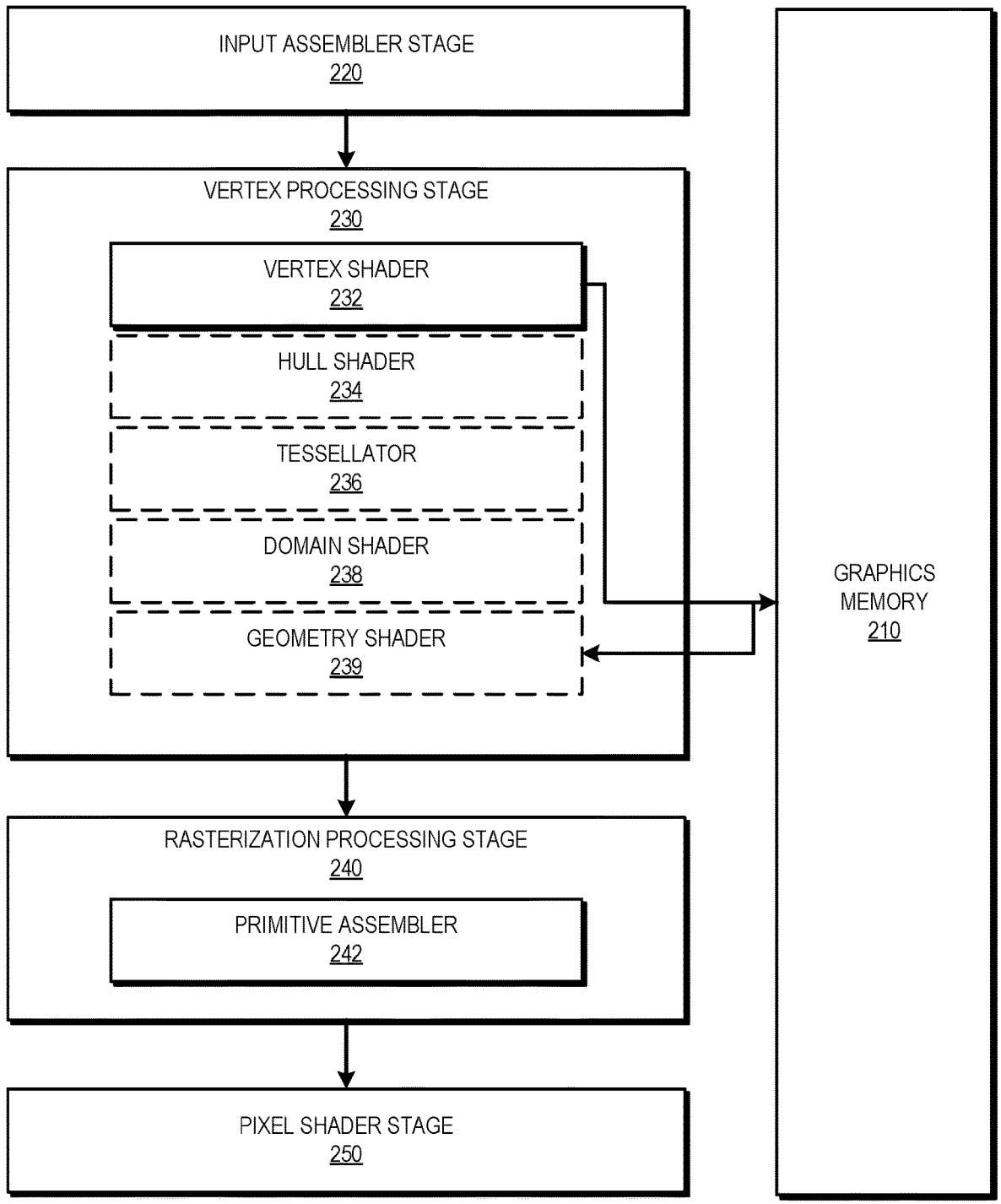
FIG. 2 is a block diagram illustrating a conventional graphics processing pipeline.

FIG. 2 is a block diagram illustrating a conventional graphics processing pipeline 200. FIG. 2 shows various elements and pipeline stages associated with a GPU. There may however be other elements and stages of the graphics processing pipeline that are not illustrated in FIG. 2. It should also be noted that FIG. 2 is only schematic, and that, for example, in practice the shown functional units and pipeline stages may share hardware circuits, even though they are shown schematically as separate stages in FIG. 2. It will also be appreciated that each of the stages, elements and units of the graphics processing pipeline 200 may be implemented as desired and will accordingly include, for example, appropriate circuitry and/or processing logic for performing the associated operation and functions.

In various embodiments, the graphics processing pipeline 200 is configured to render graphics as images that depict a scene which has three-dimensional geometry in virtual space (sometimes referred to herein as "world space"), but potentially a two-dimensional geometry. The graphics processing pipeline 200 typically receives a representation of a three-dimensional scene, processes the representation, and outputs a two-dimensional raster image. These stages of graphics processing pipeline 200 process data that is initially properties at end points (or vertices) of a geometric primitive, where the primitive provides information on an object being rendered. Typical primitives in three-dimensional graphics include triangles and lines, where the vertices of these geometric primitives provide information on, for example, x-y-z coordinates, texture, and reflectivity.

Throughout the graphics processing pipeline 200, data is read from and written to one or more memory units, which are generally denoted in FIG. 2 as graphics memory 210. The graphics memory 210 includes a hierarchy of one or more memories or caches that are used to implement buffers and store vertex data, texture data, and the like. The graphics memory 210 is implemented using some embodiments of the system memory 106 shown in FIG. 1.

The graphics memory 210 contains video memory and/or hardware state memory, including various buffers and/or graphics resources utilized in the rendering pipeline. In various embodiments, one or more individual memory units of the graphics memory 210 is embodied as one or more video random access memory unit(s), one or more caches, one or more processor registers, and the like, depending on the nature of data at the particular stage in rendering. Accordingly, it is understood that graphics memory 210 refers to any processor accessible memory utilized in the graphics processing pipeline 200. A processing unit, such as a specialized GPU, is configured to perform various operations in the pipeline and read/write to the graphics memory 210 accordingly.

The early stages of the graphics processing pipeline 200 include operations performed in world space before a scene is rasterized and converted to screen space as a set of discrete picture elements suitable for output on the pixel display device. Throughout the graphics processing pipeline 200, various resources contained in the graphics memory 210 are utilized at the pipeline stages and inputs and outputs to the stages are temporarily stored in buffers contained in the graphics memory 210 before the final values of the images are determined.

An input assembler stage 220 is configured to access information from the graphics memory 210 that is used to define objects that represent portions of a model of a scene. For example, in various embodiments, the input assembler stage 220 reads primitive data (e.g., points, lines and/or triangles) from user-filled buffers and assembles the data into primitives that will be used by other pipeline stages of the graphics processing pipeline 200. As used herein, the term "user" refers to the application 112 or other entity that provides shader code and three-dimensional objects for rendering to the graphics processing pipeline 200. The term "user" is used to distinguish over activities performed by the APD 104. The input assembler stage 210 assembles vertices into several different primitive types (such as line lists, triangle strips, or primitives with adjacency) based on the primitive data include in the user-filled buffers and formats the assembled primitives for use by the rest of the graphics processing pipeline 200.

In various embodiments, the graphics processing pipeline 200 operates on one or more virtual objects defined by a set of vertices set up in world space and having geometry that is defined with respect to coordinates in the scene. For example, the input data utilized in the graphics processing pipeline 200 includes a polygon mesh model of the scene geometry whose vertices correspond to the primitives processed in the rendering pipeline in accordance with aspects of the present disclosure, and the initial vertex geometry is set up in the graphics memory during an application stage implemented by a CPU.

A vertex processing stage 230 includes various computations to process the vertices of the objects in world space geometry. In some embodiments, the vertex processing stage 230 includes a vertex shader 232 to perform vertex shader computations, which manipulate various parameter values of the vertices in the scene, such as position values (e.g., X-Y coordinate and Z-depth values), color values, lighting values, texture coordinates, and the like. Preferably, the vertex shader computations are performed by one or more programmable vertex shaders 232. The vertex shader computations are performed uniquely for each zone that an object overlaps, and an object zone index is utilized during vertex shading to determine which rendering context and the associated parameters that the object uses, and, accordingly, how the vertex values should be manipulated for later rasterization. In various embodiments, the vertex shader 232 is implemented in software, logically receives a single vertex of a primitive as input, and outputs a single vertex. Some embodiments of vertex shaders implement single-instruction-multiple-data (SIMD) processing so that multiple vertices are processed concurrently.

The vertex processing stage 230 also optionally includes additional vertex processing computations, which subdivide primitives and generates new vertices and new geometries in world space. As illustrated in FIG. 2, the vertex processing stage 230 optionally includes a hull shader stage 234, a tessellator stage 236, a domain shader stage 238, and a geometry shader stage 239. The hull shader stage 234 operates on input high-order patches or control points that are used to define the input patches. The hull shader stage 234 outputs tessellation factors and other patch data. Primitives generated by the hull shader stage 234 can optionally be provided to the tessellator stage 236. The tessellator stage 236 receives objects (such as patches) from the hull shader stage 234 and generates information identifying primitives corresponding to the input object, e.g., by tessellating the input objects based on tessellation factors provided to the tessellator stage 236 by the hull shader stage 234. Tessellation subdivides input higher-order primitives such as patches into a set of lower-order output primitives that represent finer levels of detail, e.g., as indicated by tessellation factors that specify the granularity of the primitives produced by the tessellation process. A model of a scene can therefore be represented by a smaller number of higher-order primitives (to save memory or bandwidth) and additional details can be added by tessellating the higher-order primitive.

The domain shader stage 238 inputs a domain location and (optionally) other patch data. The domain shader stage 238 operates on the provided information and generates a single vertex for output based on the input domain location and other information. A geometry shader stage 239 receives an input primitive and outputs up to four primitives that are generated by the geometry shader stage 239 based on the input primitive. In some embodiments, the geometry shader stage 239 retrieves vertex data from graphics memory 210 and generates new graphics primitives, such as lines and triangles, from the vertex data in graphics memory 210. In particular, geometry shader stage 239 retrieves vertex data for a primitive, as a whole, and generates zero or more primitives. For example, geometry shader stage 239 can operate on a triangle primitive with three vertices.

Once the vertex processing stage 230 is complete, the scene is defined by a set of vertices which each have a set of vertex parameter values stored in the graphics memory 210. In certain implementations, the vertex parameter values output from the vertex processing stage 230 include positions defined with different homogeneous coordinates for different zones.

The graphics processing pipeline 200 then proceeds to rasterization processing stages 240. The rasterization processing stages 240 perform shading operations and other operations such as clipping, perspective dividing, scissoring, and viewport selection, and the like. In various embodiments, the rasterization processing stages 240 convert the scene geometry into screen space and a set of discrete picture elements (e.g., pixels used during the graphics processing pipeline, although it is noted that the term pixel does not necessarily mean that the pixel corresponds to a display pixel value in the final display buffer image). The virtual space geometry transforms to screen space geometry through operations that compute the projection of the objects and vertices from world space to the viewing window (or "viewport") of the scene that is made up of a plurality of discrete screen space pixels sampled by the rasterizer. In accordance with aspects of the present disclosure, the screen area includes a plurality of distinct zones with different rendering parameters, which include different rasterization parameters for the different zones.

The rasterization processing stage 240 depicted in the figure includes a primitive assembly stage 242, which sets up the primitives defined by each set of vertices in the scene. Each vertex is defined by a vertex index, and each primitive is defined with respect to these vertex indices and stored in index buffers in the graphics memory 210. The primitives should include at least triangles that are defined by three vertices each, but also include point primitives, line primitives, and other polygonal shapes. During the primitive assembly stage 242, certain primitives are optionally culled. For example, those primitives whose vertex indices and homogeneous coordinate space positions indicate a certain winding order are considered to be back-facing and therefore culled from the scene. Primitive assembly stage 242 also includes screen space transformations for the primitive vertices, which optionally include different screen space transform parameters for different zones of the screen area.

The rasterization processing stages 240 always performs clipping, a perspective divide to transform the points into homogeneous space and maps the vertices to the viewport. The raster data is snapped to integer locations that are then culled and clipped (to draw the minimum number of pixels), and per-pixel attributes are interpolated (from per-vertex attributes). In this manner, the rasterization processing stages 240 determines which pixel primitives overlap, clips primitives and prepares primitives for the pixel shader and determines how to invoke the pixel shader stage 250.

Traditional geometry pipelines, such as graphics processing pipeline 200, discard primitives after vertex processing is completed, which can waste computing resources and create processing bottlenecks. For example, in a typical scene around half of the geometry will be discarded through various techniques such as frustum culling, back-face culling, and small-primitive culling. The faster these primitives are discarded, the faster the GPU can start rendering the visible geometry. In the embodiment of FIG. 2, because clipping operations occur at the rasterization processing stages 240 and/or culling operations occur at the primitive assembly stage 242, some operations that occur in the vertex shader, such as determining vertex non-position parameters, are unnecessary. More specifically, attributes are determined for shaded vertices that are eventually dropped due to culling, resulting in wasted computation and bandwidth due to culled triangles (e.g., outside of the viewing frustum or failing a facing test).

Figure 3:
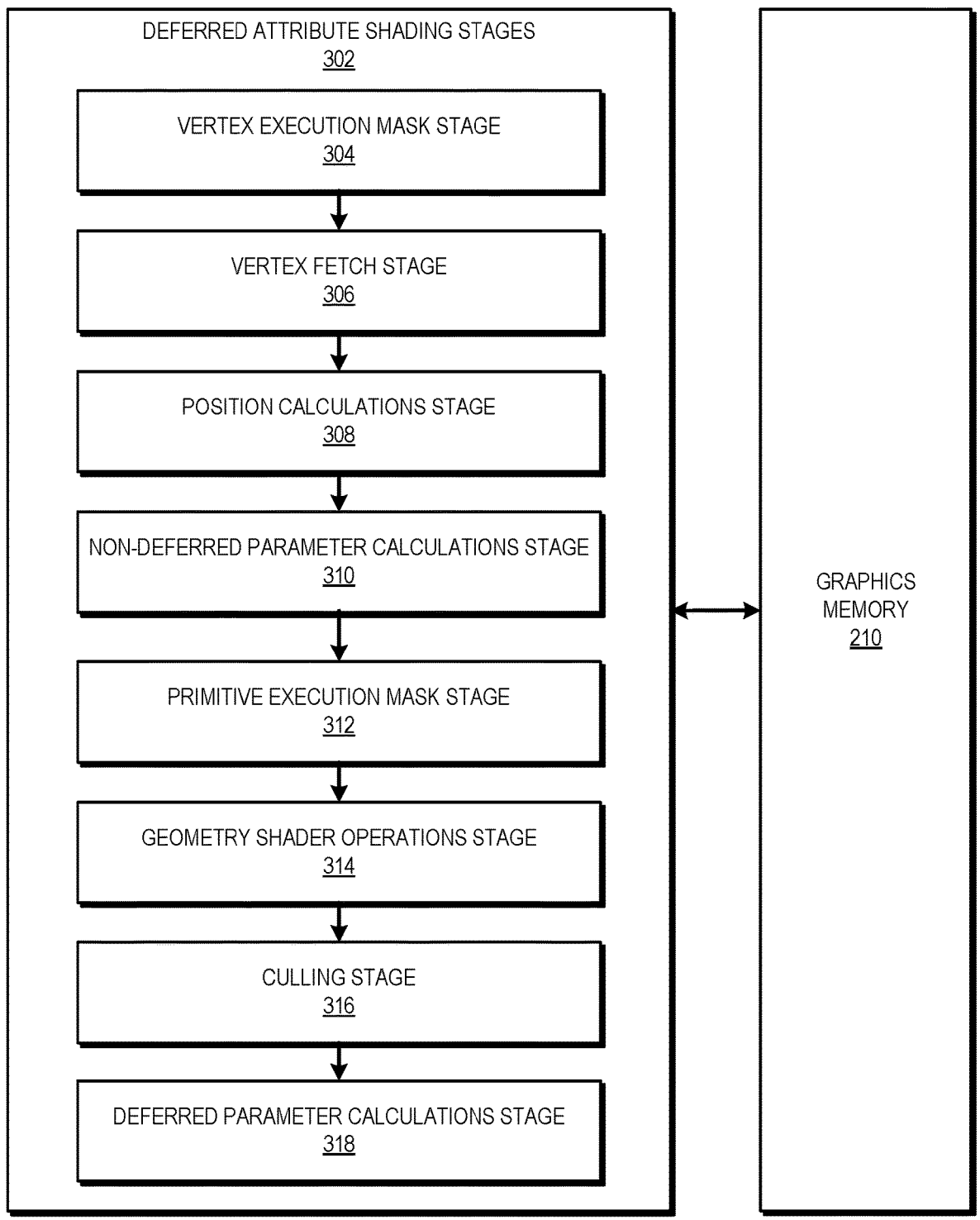
FIG. 3 is a block diagram illustrating a graphics processing pipeline utilizing deferred vertex attribute shading in accordance with some embodiments.

To address the effects of performing computations on subsequently culled vertices and primitives, in various embodiments, the processing system 100 is configured to perform deferred attribute shading. FIG. 3 is a block diagram illustrating a graphics processing pipeline 300 utilizing deferred vertex attribute shading in accordance with some embodiments. The graphics processing pipeline 300 includes at least a plurality of deferred attribute shading stages 302. In some embodiments, the plurality of deferred attribute shading stages 302 are implemented partially or fully as shader programs that execute at the processing cores 122 of FIG. 1. Portions of the plurality of deferred attribute shading stages 302 not implemented as shader programs are implemented in fixed function hardware.

The plurality of deferred attribute shading stages 302 includes a vertex execution mask stage 304, a vertex fetch stage 306, a position calculations stage 308, a non-deferred parameter calculations stage 310, a primitive execution mask stage 312, a geometry shader operations stage 314, a culling stage 316, and a deferred parameter calculations stage 318.

The vertex execution mask stage 304 sets up an execution mask that indicates which work-items in a wavefront are to execute a shader program (and which are to be switched off, via, e.g., predication) until the next change in the execution mask. Execution masks are used such that single wavefronts can be spawned to perform different types of work. More specifically, each wavefront spawned in the APD 104 is spawned to execute a particular shader program. For vertex related work (e.g., the vertex fetch stage 306 and the position calculations stage 308), each work-item works on a single vertex. For primitive related work (e.g., the geometry shader operations stage 314 and the culling stage 316), each work-item works on a primitive. The number of work-items used in shaders is often workload dependent; an execution mask can be primitive dominant (e.g., tessellation or high vertex reuse) or vertex dominant (e.g., with lower vertex reuse). Because two separate types of work are processed in the same shader, execution masks are used to disable or enable work-items of a wavefront when the type of work that a wavefront executes changes. In various embodiments, the vertex execution mask stage 304 sets the number of active work-items to a number appropriate for executing the vertex-related operations.

The vertex fetch stage 306 fetches vertex data based on received indices. More specifically, vertex data is handled as pointers to the vertex data (hereinafter referred to as "indices") rather than as the vertex data themselves. Indices are pointers to vertex data that allow certain operations to occur, such as duplicate vertex detection, identification of primitives from vertices based on a selected primitive topology, and other operations, without handling the large amounts of data associated with the vertex data. At some point, however, the actual vertex data does get processed, such as when performing vertex position transforms. At this point, vertex data is obtained based on the indices. The vertex fetch stage 306 performs these operations, fetching vertex data from memory based on the indices and loading the vertex data into registers for processing by, for example, the processing cores 122.

In some embodiments, the position calculations stage 308 is derived from user-provided code for the vertex shaders 232 in vertex processing stage 230 of FIG. 2. To generate the position calculations stage 308, the device driver 114 of FIG.

1 extracts the instructions associated with performing position transforms from the user-provided vertex shader code. In one example, the device driver 114 identifies the instructions associated with performing position transformations based on the outputs specified by the vertex shader code provided by the one or more applications 112.

The position calculations stage 308 performs position transforms (e.g., converting vertex positions from model space to clip space, which include model view transforms or other transforms associated with the vertex processing stage 230) specified by the user-provided vertex shader code for the vertices fetched by the vertex fetch stage 306. More specifically, the vertex shader code identifies what outputs are associated with transformed vertex positions. The device driver 114 identifies the instructions upon which these outputs depend as the instructions to be included in the position calculations stage 308. In some embodiments, the position calculations stage 308 exports calculated positions to the graphics memory 210 (e.g., local data store or an offchip memory device) for use by other stages of the deferred attribute shading stages 302.

The non-deferred parameter calculations stage 310 include calculations for vertex non-position attributes that are not deferrable until after culling and small triangle discard (by the culling and small triangle discard stage 316). These calculations are also based on the user-provided code for the vertex processing stage 230. Some parameter calculations cannot be deferred because the device driver 114 is unable to isolate them from the vertex shader program and thus cannot shift them in time until after culling. For example, in various embodiments, non-deferrable attributes include any attribute that contributes to position. Additionally, in various embodiments, non-deferrable attributes also include an actual parameter export. As with vertex position transforms for the position calculations stage 308, the device driver 114 extracts the instructions for the non-position attribute calculations from the user provided vertex shader code by examining the outputs specified by that code that are associated with the attributes for which calculation is not deferrable and identifying the instructions upon which those outputs depend.

The primitive execution mask stage 312 sets the execution mask for the work-items of the wavefront based on the number of work-items that are to perform per-primitive operations. The primitive execution mask stage 312 can reduce or increase the number of active work-items, but typically, the number of active work-items is reduced because there are multiple vertices per primitive and work items are assigned one per vertex for vertex processing and one per primitive for primitive processing. Data for primitive processing that is dependent on the results of vertex operations executed by work-items is available to work-items in a wavefront executing primitive operations via registers available to SIMD units 124. In some embodiments, the hardware providing a primitive shader provides connectivity information instructing which vertex lanes to pull to compose a primitive (e.g., the three vertices of a triangle).

The geometry operations stage 314 performs per-primitive operations specified by user-provided code for the geometry shader stage 240. In various embodiments, the geometry shader stage runs application-specified shader code with vertices as input and the ability to generate vertices on output. Unlike vertex shaders, which operate on a single vertex, the geometry shader's inputs for the geometry operations stage 314 are the vertices for a full primitive (two vertices for lines, three vertices for triangles, or single vertex for point). Geometry shaders also bring in the vertex data for the edge-adjacent primitives as input (an additional two vertices for a line, an additional three for a triangle). Geometry shader programs typically accept whole primitives (e.g., a collection of vertices) as input and perform operations on those whole primitives as specified by the instructions of the geometry shader programs. A variety of different types of operations can be performed by the geometry operations stage 314, including operations such as point sprite expansion, dynamic particle system operations, fur-fin generation, shadow volume generation, single pass render-to-cubemap, per-primitive material swapping, and per-primitive material setup.

The culling and small triangle discard stage 316 performs various culling operations involving removal of elements that will not impact the final rendered scene. In some embodiments, the culling and small triangle discard stage 316 includes frustum culling to discard primitives outside of the view frustum (i.e., the 3D portion of space that can be viewed by the view camera for which rendering is being performed). In some embodiments, the culling and small triangle discard stage 316 includes back-face culling to discard primitives that are invisible to the view camera because the back face of such elements faces away from the camera. In some embodiments, the culling and small triangle discard stage 316 includes occlusion culling to discard primitives that that are blocked or occluded by other elements and are therefore not visible in the rendered scene. In some embodiments, the culling and small triangle discard stage 316 includes small triangle culling to discard triangles too small to be visible in the rendered scene (e.g., primitives that are so small that the primitives do not cover any screen pixel). Other types of culling operations are known in the art as well. The benefit of the culling and small triangle discard stage 316 is that the number of primitives that travel through and are processed by subsequent deferred attribute shading stages 302 of the graphics processing pipeline 300 is reduced.

The deferred parameter calculations stage 318 performs attribute calculations after primitives are culled in the culling and small triangle discard stage 316. The advantage of performing these attribute calculations after culling is that non-visible primitives have been discarded and so attributes are not determined for primitives that do not contribute to the final scene. In some embodiments, the device driver 114 obtains instructions for the deferred parameter calculations stage 318 from the user-provided code for the vertex processing stage 230. The device driver 114 extracts the instructions for determining these parameters by identifying outputs indicated as being associated with these parameters and identifying the instructions in the code for the vertex processing stage 230 upon which the outputs depend. Deferring attribute processing until after culling operations associated with culling prevents the attribute processing from occurring for primitives that would be culled and thus not contribute to the rendered scene. Accordingly, attribute shading for non-position attributes is deferred such that shading is only submitted for primitives that survive the clip-and-cull phase. For example, in various embodiments, the non-position attributes include but are not limited to attributes such as color, texture, surface normals, and the like. In some embodiments, the non-position attributes further include auxiliary position attributes that are required by the rasterization pipeline (e.g., render target array index, viewport array index, and the like), but are not XYZW position values. This eliminates redundant computation and bandwidth for vertices contributing only to triangles which are culled.

In some embodiments, one or more of plurality of deferred attribute shading stages 302 of FIG. 3 are implemented in shader code implementing vertex shaders, geometry shaders, and the like. In other embodiments, one or more of plurality of deferred attribute shading stages 302 of FIG. 3 are implemented in a primitive shader (not shown) as generally known to those skilled in the art. With the primitive shader, much of the shader functionality is performed in programmable processing units (e.g., SIMD units 124 of FIG. 1) instead of fixed function hardware (e.g., the primitive assembler 242 of FIG. 2). This shift from fixed-function to shader code for programmable hardware provides certain benefits, such as reduction of bottlenecks in the graphics pipeline without requiring a fundamental change to the underlying physical architecture.

In some embodiments, culling by the shader code augments fixed function culling. The code that represents the shader functions is inserted by a compiler in addition to any shader functionality code that is created by the application developer. For example, the compiler inserts code that represents a shader function that performs one or more of frustum culling, backface culling, and small primitive culling as the compiler is compiling code produced by a developer. The culling code inserted by the compiler is executed in parallel on multiple compute units, which alleviates the bottleneck at the fixed function hardware. The number of compute units available to execute the shader code is significantly larger than the number of fixed function hardware blocks so culling performed by the shader code inserted by the compiler reduces or eliminates bottlenecks in the culling process.

Figure 4:
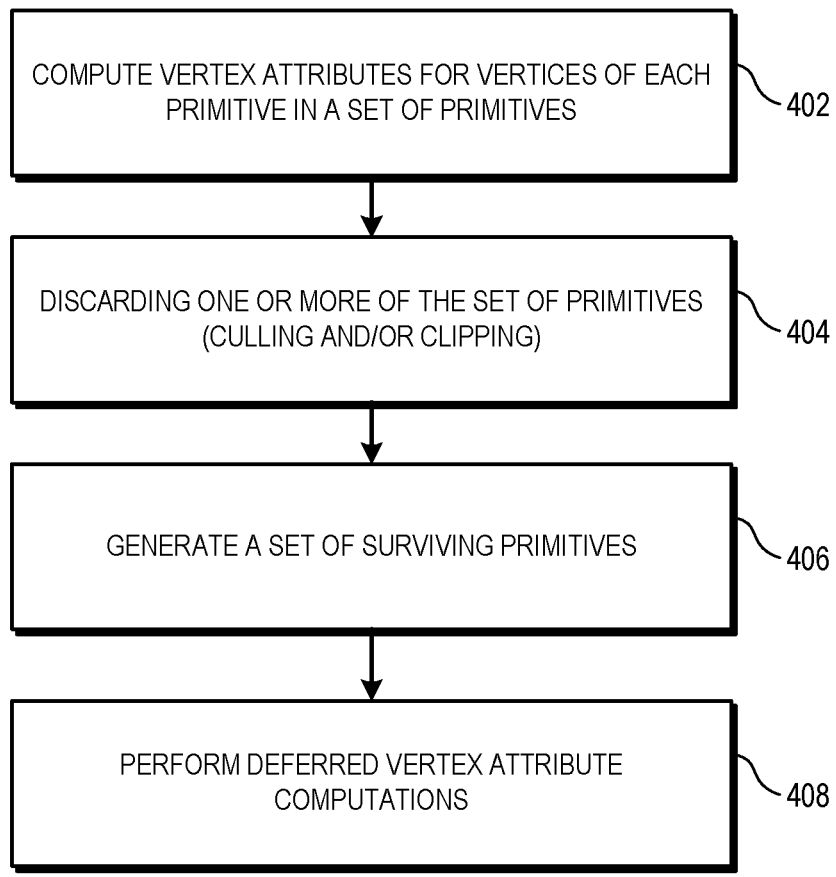
FIG. 4 is a flow diagram illustrating a method of deferred vertex attribute shading in accordance with some embodiments.

FIG. 4 is a flow diagram illustrating a method 400 for performing deferred vertex attribute shading according to some embodiments. The method 400 is implemented in some embodiments at the APD 104 of the processing system 100 as shown in FIG. 1 or the graphics processing pipeline 300 of FIG. 3. Although described with respect to the system shown and described with respect to FIGS. 1-3, it should be understood that any system configured to perform the method, in any technically feasible order, falls within the scope of the present disclosure.

At block 402, the method 400 begins by computing, at a graphics processing pipeline of a graphics processing unit (GPU), a plurality of vertex attributes for vertices of each primitive of a set of primitives. In some embodiments, the operations of block 402 are performed at a vertex shader stage of a graphics processing pipeline by transforming vector positions for vertices of each primitive of the set of primitives. In other embodiments, the operations of block 402 are performed at a primitive shader of the graphics processing pipeline.

The plurality of vertex attributes includes a vertex position attribute and a first non-position attribute. For example, in some embodiments, a position calculations stage (e.g., at a vertex shader 232 of FIG. 2 or position calculations stage 308 of FIG. 3) identifies the vertices of primitives within an image geometry based on, for example, a four-dimensional coordinate system with X, Y, and Z coordinates (e.g., XYZ coordinates on the X, Y, Z axes) that identify a location of a vertex within the image geometry, and a W coordinate that comprises a perspective parameter for the image geometry.

In various embodiments, the first non-position attribute is a non-deferred parameter for which computations cannot be shifted in time to be performed after the discarding of one or more primitives of the set of primitives that do not contribute to the rendered image. For example, such as described in more detail relative to FIG. 3, non-deferred parameter calculations stage 310 include calculations for vertex non-position attributes that are not deferrable until after culling and small triangle discard (e.g., by the culling and small triangle discard stage 316). Some parameter calculations cannot be deferred because the device driver 114 is unable to isolate the non-deferred parameter from the vertex shader program and thus cannot shift them in time to be performed after culling.

At block 404, the method 400 continues by discarding, at the graphics processing pipeline, one or more primitives of the set of primitives that do not contribute to a rendered image based upon the vertex position attribute for vertices of the set of primitives. In various embodiments, discarding one or more primitives includes culling one or more non-visible primitives in the rendered image from the set of primitives. For example, such as described in more detail relative to FIG. 3, various culling operations involve removal of elements that will not significantly impact the final rendered scene. In some embodiments, the operations of block 404 include frustum culling to discard primitives outside of the view frustum (i.e., the 3D portion of space that can be viewed by the view camera for which rendering is being performed). In some embodiments, the operations of block 404 include back-face culling to discard primitives that are invisible to the view camera because the back face of such elements face away from the camera. In some embodiments, the operations of block 404 include occlusion culling to discard primitives that that are blocked or occluded by other elements and are therefore not visible in the rendered scene. In some embodiments, the operations of block 404 include small triangle culling to discard triangles too small to be visible in the rendered scene (e.g., primitives that are so small that the primitives do not cover any screen pixel). At block 406, the method 400 continues by generating, based on the discarding of one or more primitives, a set of surviving primitives. In particular, the set of surviving primitives includes a subset of the set of primitives remaining after discarding primitives culled by the operations of block 404.

At block 408, the method 400 continues by computing, at the graphics processing pipeline, a second non-position attribute for vertices of the set of surviving primitives. The second non-position attribute is a deferred parameter that is not computed until after the discarding of one or more primitives of the set of primitives that do not contribute to the rendered image. In various embodiments, such as described in more detail relative to FIG. 3, the operations of block 408 include deferred parameter calculations that are performed after primitives culling operations of block 404. The advantage of performing these attribute calculations after culling is that non-visible primitives have been discarded and so attributes are not determined for primitives that do not contribute to the final scene. Deferring attribute processing until after culling operations associated with culling prevents the attribute processing from occurring for primitives that would be culled and thus not contribute to the rendered scene. Subsequently, primitives data (e.g., processed vertices, vertex attributes, position and parameter data, and the like) is exported to, for example, LDS or graphics memory 210 for retrieval and processing by other graphics processing pipeline stages.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    deferring shading of a set of primitives prior to a primitive assembly stage of a graphics processing pipeline by discarding, prior to the primitive assembly stage of the graphics processing pipeline, a non-degenerate primitive of the set of primitives that does not contribute to a rendered image, wherein the primitive assembly stage is configured to set up one or more primitives based on a plurality of vertices;
    generating, based on the discarding of the non-degenerate primitive, a set of surviving primitives; and in response to generating the set of surviving primitives, computing, at the graphics processing pipeline, a deferred parameter of the set of surviving primitives.

2. The method of claim 1, further comprising:
    determining, at the graphics processing pipeline, a respective plurality of vertex attributes for vertices of each primitive of the set of primitives, wherein the respective plurality of vertex attributes for vertices of each primitive comprises a vertex position attribute and a first non-position attribute.

3. The method of claim 2, further comprising:
    determining the non-degenerate primitive of the set of primitives does not contribute to the rendered image based on the respective plurality of vertex attributes associated with the non-degenerate primitive.

4. The method of claim 1, wherein discarding the non-degenerate primitive comprises at least one of a frustum culling, a back-face culling, and a small-primitive culling.

5. The method of claim 2, wherein determining the respective plurality of vertex attributes comprises:
    transforming vector positions, at a vertex shader stage of the graphics processing pipeline, for vertices of each primitive of the set of primitives.

6. The method of claim 2, wherein determining the respective plurality of vertex attributes comprises:
    transforming vector positions, at a primitive shader of the graphics processing pipeline, for vertices of each primitive of the set of primitives.

7. A system comprising:
    a central processing unit (CPU); and
    an accelerated processing device (APD), the APD comprising:
        a graphics processing pipeline and a plurality of processor cores configured to execute a wavefront comprising a plurality of threads, wherein the graphics processing pipeline includes a plurality of deferred attribute shading stages configured to: defer shading of a set of primitives prior to a primitive assembly stage of the graphics processing pipeline by discarding, prior to the primitive assembly stage of the graphics processing pipeline, a non-degenerate primitive of the set of primitives that does not contribute to a rendered image, wherein the primitive assembly stage is configured to set up one or more primitives based on a plurality of vertices;
            generate, based on discarding the non-degenerative primitive, a set of surviving primitives; and
        in response to generating the set of surviving primitives, compute a deferred parameter of the set of surviving primitives.

8. The system of claim 7, wherein the plurality of deferred attribute shading stages are further configured to determine a respective plurality of vertex attributes for vertices of each primitive of the set of primitives, wherein the respective plurality of vertex attributes for vertices of each primitive comprises a vertex position attribute and a first non-position attribute.

9. The system of claim 8, wherein the plurality of deferred attribute shading stages are further configured to determine the non-degenerate primitive of the set of primitives does not contribute to the rendered image based on the respective plurality of vertex attributes associated with the non-degenerate primitive.

10. The system of claim 9, wherein the graphics processing pipeline further includes a vertex shader configured to:
perform vector position transformations for vertices of each primitive of the set of primitives; and
compute the respective plurality of vertex attributes for vertices of each primitive of the set of primitives.

11. The system of claim 8, wherein the deferred parameter comprises a second non-position attribute for vertices of the set of primitives.

12. The system of claim 7, wherein the graphics processing pipeline further includes a culling stage configured to discard non-visible primitives in the rendered image from the set of primitives.

13. The system of claim 12, wherein the culling stage is configured to perform at least one of a frustum culling, a back-face culling, and a small- primitive culling on the set of primitives.

14. A non-transitory computer-readable storage medium storing instructions that, when executed by a processor, cause a processing system to perform the steps of:
deferring shading of a set of primitives prior to a primitive assembly stage of a graphics processing pipeline by discarding, at the graphics processing pipeline and prior to the primitive assembly stage of the graphics processing pipeline, a non- degenerate primitive of the set of primitives that does not contribute to a rendered image, wherein the primitive assembly stage is configured to set up one or more primitives based on a plurality of vertices;
generating, based on the discarding of the non-degenerate primitive, a set of surviving primitives; and
computing, at the graphics processing pipeline, a deferred parameter for the set of surviving primitives.

15. The non-transitory computer-readable storage medium of claim 14, further storing instructions that, when executed by the processor, perform the steps of:
determining, at the graphics processing pipeline, a respective plurality of vertex attributes for vertices of each primitive of the set of primitives, wherein the respective plurality of vertex attributes for vertices of each primitive comprises a vertex position attribute and a first non-position attribute.

16. The non-transitory computer-readable storage medium of claim 15, further storing instructions that, when executed by the processor, perform the steps of:
determining the first non-position attribute prior to any discarding of one or more primitives of the set of primitives that do not contribute to the rendered image.

17. The non-transitory computer-readable storage medium of claim 15, further storing instructions that, when executed by the processor, perform the steps of:
determining the non-degenerate primitive of the set of primitives does not contribute to the rendered image based on the respective plurality of vertex attributes associated with the non-degenerate primitive.

18. The non-transitory computer-readable storage medium of claim 14, further storing instructions that, when executed by the processor, perform the steps of:
transforming vector positions, at a vertex shader stage of the graphics processing pipeline, for vertices of each primitive of the set of primitives.

19. The non-transitory computer-readable storage medium of claim 14, further storing instructions that, when executed by the processor, perform the steps of:
transforming vector positions, at a primitive shader of the graphics processing pipeline, for vertices of each primitive of the set of primitives.

* * * * *